United States Patent [19]
Kondo et al.

[11] Patent Number: 5,105,216
[45] Date of Patent: Apr. 14, 1992

[54] PROCESS CAMERA HAVING IMPROVED FOCUSING GLASS FRAME AND THE FOCUSING GLASS FRAME THEREOF

[75] Inventors: Kazuyoshi Kondo; Shoji Komatsubara, both of Shiga, Japan

[73] Assignee: Dainippon Screen Manufacturing Co., Ltd., Kyoto, Japan

[21] Appl. No.: 641,825

[22] Filed: Jan. 16, 1991

[30] Foreign Application Priority Data

Jan. 16, 1990 [JP] Japan ................. 2-2977[U]

[51] Int. Cl.$^5$ ................. G03B 13/24; G03B 13/36
[52] U.S. Cl. .......................... 355/44; 355/73
[58] Field of Search ............ 355/44, 55, 59, 61, 355/73

[56] References Cited

U.S. PATENT DOCUMENTS

| | | | |
|---|---|---|---|
| 3,077,141 | 2/1963 | Wanielista et al. | 355/73 |
| 3,125,336 | 3/1964 | Wanielista | 355/73 |
| 3,295,408 | 1/1967 | Rab | 355/61 |
| 3,424,530 | 1/1969 | Leonhart | 355/61 |
| 3,998,546 | 12/1976 | Wally, Jr. et al. | 355/61 X |
| 4,591,251 | 5/1986 | Fisher | 355/44 X |
| 4,989,033 | 1/1991 | Yamashita | 355/44 X |

Primary Examiner—Richard A. Wintercorn
Attorney, Agent, or Firm—Lowe, Price, LeBlanc & Becker

[57] ABSTRACT

A process camera includes: an original holder; a lens for projecting an image of the original on an image forming plane; a frame having an opening defining the image forming plane; a focusing glass attached to the frame movable between a portion covering only a part of the opening of the frame and an open position freeing the opening for forming an image of the original of the surface thereof; a vacuum board for holding a film thereon; and a member for mounting to the frame the vacuum board rotatably around a predetermined axis of rotation between a closed position covering all of the opening and a position covering only a part of the opening. Since the area of the focusing glass is selected to be smaller than the area of the opening, the area required by the focusing glass at the open position is small. The axis of rotation of the vacuum board is provided crossing the opening, but not along sides of the opening. The axis of rotation of the vacuum board is provided at a position other than an end portion of the vacuum board.

22 Claims, 4 Drawing Sheets

PROCESS CAMERA HAVING IMPROVED FOCUSING GLASS FRAME AND THE FOCUSING GLASS FRAME THEREOF

BACKGROUND OF THE INVENTION

1. Field of the Invention

The present invention relates to process cameras, and particularly to improvements in operability of process cameras. The present invention further relates to the focusing glass frames of such process cameras.

2. Background of Prior Art

As a focusing glass frame used in a process camera, e.g., a vertical process camera, one shown in FIG. 1 has been conventionally known. Referring to FIG. 1, the focusing glass frame of the conventional process camera includes a frame 2 provided protruding frontward from a head portion of a vertical frame (not shown). An operation panel 6 is provided in the front of frame 2. Frame 2 has a rectangular opening on its upper surface.

Viewed from the front, a translucent focusing glass 104 is provided on the right side, and a vacuum board 105 for holding a film by suction is provided on the left side. Focusing glass 104 is mounted on the upper surface of frame 2 by means of a hinge (not shown). Focusing glass 104 can pivot along the arrow 111. A handle 61 is provided on the left front surface of focusing glass 104. Vacuum board 105 is mounted at the left end of the upper surface of frame 2 by means of a hinge similarly to focusing glass 104. Vacuum board 105 can pivot along the arrow 110. A handle 19 is attached to vacuum board 105.

On the right side portion of frame 2, a working table 48 used in measuring density of an original is provided. On the upper surface of working table 48, a light emission window 17 for emitting light used when measuring density is provided. On the upper surface of working table 48, a light measuring probe 18 is further located. The light emitting window 17 and the light measuring probe 18 constitute a densitometer 7.

A lens (not shown) is provided under frame 2 with a bellows 8 provided therebetween.

The conventional process camera operates as described below. First, focusing glass 104 is located on the opening of frame 2. A lens (not shown) projects an optical image of an original (not shown) on the surface of focusing glass 104. After assuring oneself that the image was well formed, an operator pivots focusing glass 104 to open the opening.

A film is held by vacuum board 105 under safelight. The operator holds handle 19 to pivot vacuum board 105, which is located at a position where focusing glass 104 was previously located. Subsequently, the operator operates an operation panel 6 to have a light source emit light in order to expose the film.

After exposure, the operator holds handle 19 again to pivot vacuum board 105 in order to open the opening of frame 2.

As described-above, in a conventional process camera, one of focusing glass 104 and vacuum board 105 is selectively located on the opening portion of frame 2 for confirmation of image conditions and exposure.

Conventional process cameras, however, have the following defects. In a conventional process camera, focusing glass 104 and vacuum board 105 pivot to protrude on the right and left sides of frame 2, respectively. Since focusing glass 104 and vacuum board 105 have the same dimensions as that of the opening portion of frame 2, the process camera requires a large installation area.

An edge of vacuum board 105 is located considerably spaced apart from the left side portion of frame 2 when vacuum board 105 is opened. Handle 19 is also located far from the left side portion of frame 2. Especially in the case of a large process camera, it is difficult to reach the handle 19 by one's hand, so that the process camera can not be easily handled.

As the size of the process camera increases, the size of the vacuum board 105 also increases. The vacuum board 105 becomes heavier. The center of gravity of vacuum board 105 becomes more distant from the left side portion of the frame 2. The force necessary for pivoting vacuum board 105 is proportional to a product of the weight of vacuum board 105 and the distance between the center of gravity of vacuum board 105 and the left side!portion of frame 2. Accordingly, as the process camera becomes larger in size, the operability of the process camera extremely decreases.

SUMMARY OF THE INVENTION

Accordingly, it is an object of the present invention to provide a process camera capable of easy handling and a focusing glass frame employed in such a process camera.

It is another object of the present invention to provide a process camera requiring smaller installation area and a focusing glass frame employed in such a process camera.

It is still another object of the present invention to provide a process camera capable of easier movement of a vacuum board and a focusing glass frame employed in such a process camera.

It is an additional object of the present invention to provide a process camera having a vacuum board which can be moved with relatively small force even if it is large-sized, and a focusing glass frame employed in such a process camera.

A process camera according to the present invention includes: an original holder for holding an original; a lens for projecting an image of the original held by the original holder on an image forming plane; a frame having a substantially rectangular opening defining the image forming plane for forming a light shielding space between the lens and the opening by covering a portion between the lens and the opening; a focusing glass movably attached to the frame between a closed position covering, leaving a first portion of the opening of the frame, only a second portion except the first portion and an open position freeing the opening, for enabling confirmation of an in focus state by receiving light projected from the lens to form an image of the original on the surface thereof; a film holding panel having a first plane for holding photosensitive film by suction and a second plane; and a mounting member for attaching the film holding panel to the frame rotatably around a predetermined axis of rotation between a closed position covering substantially all over the opening with the first plane and an open position covering only the first portion of the opening with the second plane.

The focusing glass does not need to be of a size sufficient for covering all of the opening. Accordingly, the focusing glass can be made lighter and smaller as compared to conventional ones. The focusing glass can be operated easier, and the length of the projection of the focusing glass from the frame when it is not used is made smaller, so that the process camera needs a smaller installation area.

According to a preferred embodiment of the present invention, an axis of rotation of a film holding board is provided in the center of a portion not covered with a focusing glass at a closed position. The axis of rotation located nearer to the center than the end portion of the frame shortens the length of projection of the film holding board from the frame as compared to a conventional case. It facilitates operation of the film holding board and also provides a process camera requiring a small installation area.

According to a more preferred embodiment of the present invention, the film holding board is rectangular and rotatably held at two points opposing to each other on the longer sides the two points being displaced to the center from the shorter side. Accordingly, as compared to a conventional process camera, the point of the film holding board the most distant from the axis of rotation comes closer to the axis of rotation. Accordingly, smaller force for rotating the film holding board around the axis of rotation is sufficient as compared to a conventional case, which provides a process camera capable of easier handling.

In another aspect of the present invention, a focusing glass frame includes: a frame having a substantially rectangular opening defining an image forming plane; a focusing glass attached to the frame movably between a closed position covering, leaving a predetermined first portion of the opening, only a second portion other than the first portion of the opening and an open position freeing the opening for receiving light projected from a lens of the process camera to form an image of an original on the surface thereof; a film holding panel having a first plane for holding photosensitive film and a second plane; and a mounting member for attaching the film holding plate rotatably around a predetermined axis of rotation between a closed position almost entirely covering the opening with the first plane and an open position covering only a first portion of the opening with a part of the second plane.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
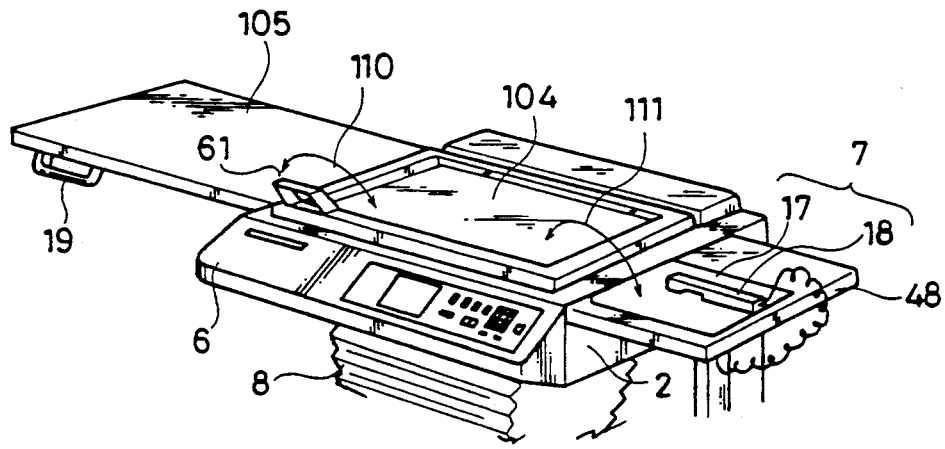
FIG. 1 is a perspective view of a conventional process camera.
Figure 2:
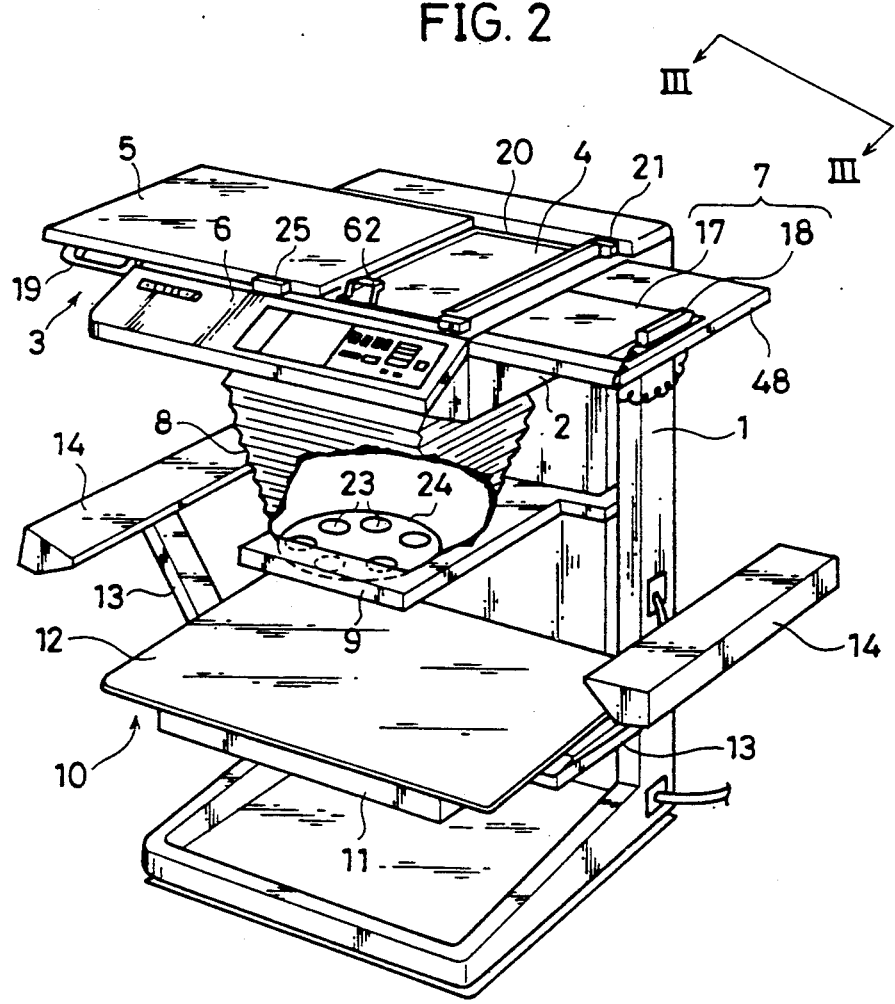
FIG. 2 is a perspective view of a process camera according to a first embodiment of the present invention.

FIG. 2 is a perspective view of a vertical process camera according to a first embodiment of the present invention. Referring to FIG. 2, the vertical process camera includes an L-shaped base frame 1, a focusing glass frame 3 provided in a head portion of the base frame 1 projecting frontwards therefrom, a lens frame 9 attached to the frame 1 movable upward and downward below the focusing glass frame 3, and an original frame 10 attached to frame 1 movably upward and downward below lens frame 9.

Focusing glass frame 3 includes a frame 2 having a rectangular opening 20, an operation panel 6 provided in the front side of frame 2, a focusing glass 4 attached to the upper surface of frame 2 at the right end of opening 20 with a pair of hinges 21, a vacuum board 5 for holding a film by suction rotatably provided with a pair of hinges 25 on the upper surface of frame 2, a working table 48 provided in an upper portion of a right side surface of frame 2 and used when measuring density of the original, and a densitometer for measuring an optical density of an original. The densitometer 7 includes a light emission window 17 provided in working table 48 and a light measuring probe 18 located on working table 48. A handle 19 is provided in a front surface of an end portion of vacuum board 5. A handle is provided on the front end of focusing glass 4.

In lens frame 9, a lens (not shown) and a filter turret 24 having a plurality of color films 23 are provided. Lens frame 9 and the lower surface of focusing glass frame 3 are connected to each other with bellows 8. Bellows 8 and frame 2 define a light shielding space surrounding an optical path of the light passed through a lens. By exchanging the lens, a magnification can be altered.

The original frame 10 includes an original table 11 attached to base frame 1 move upward and downward, with respect thereto an original holding glass plate 12 for holding an original on original table 11 with a pressure, a pair of reflection illumination light sources 14 fixed by arms 13 on original table 11, and a transmission illumination light source (not shown) attached to the lower surface of original table 11. Original frame 10 is positioned by an automatic focusing mechanism (not shown) together with lens frame 9 in order to enable photographing of the original at a desired magnification.

Figure 3:
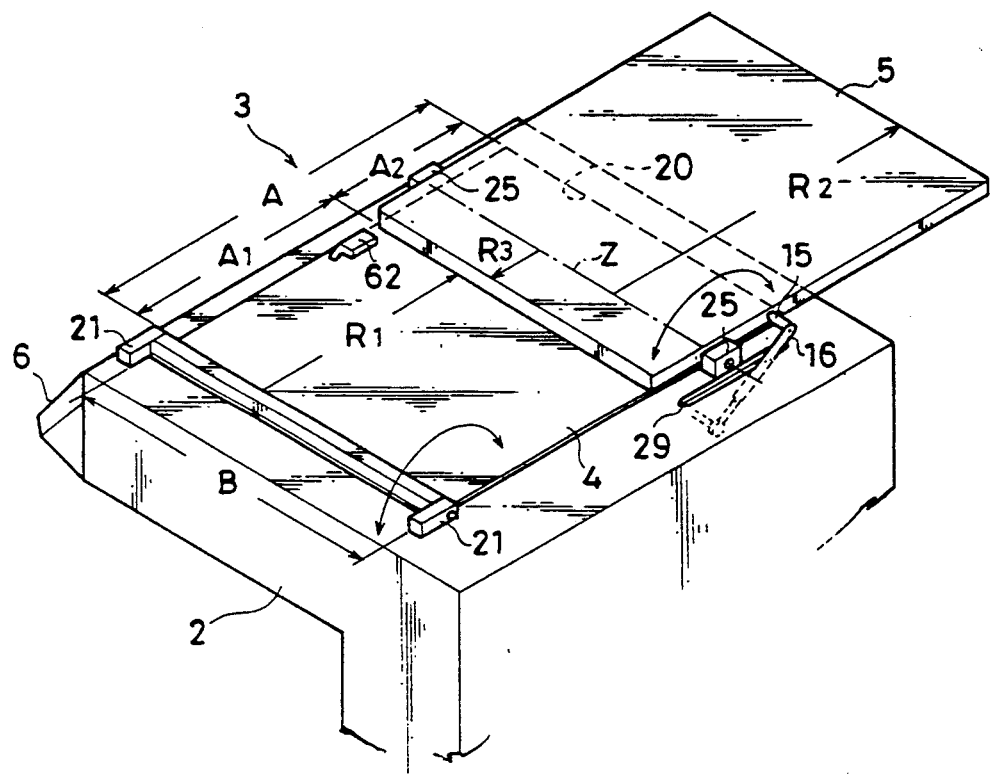
FIG. 3 is a view taken in the direction of the arrows III—III of FIG. 2.

Referring to FIG. 3, each portion of a focusing glass frame 3 of a process camera according to the present invention will be described below. It should be noted that the working table 48 and the densitometer 7 in FIG. 2 are omitted in FIG. 3 for the purpose of clarity. Referring to FIG. 3, focusing glass frame 3 includes the focusing glass 4 pivotably attached with a pair of hinges 21 to a portion on the right side of frame 2 as seen from a front side where operation panel 6 is provided, and the vacuum board 5 pivotably provided with the pair of hinges 25 at the left side of frame 2. Focusing glass 4 and vacuum board 5 can be pivoted to be selectively located on an image forming plane. A handle 62 is provided on the left front surface of focusing glass 4.

The length in A1 of focusing glass 4 in a lateral direction is selected to the larger portion i.e., more than half the area, on the right side of opening 20. Focusing glass 4 is pivotably attached through the pair of hinges 21 to the right upper surface of frame 2 as seen from front.

The length B of focusing glass 4 in the depthwise direction of frame 2 is almost the same as or a little smaller than the corresponding dimension of opening 20.

The dimensions of focusing glass 4 are selected in this way because, with an optical axis center located in the center portion of opening 20, the image of an original is formed symmetrically with respect to the axis. According to the present embodiment, forming conditions of an image can be confirmed on the right half of the image forming plane. Furthermore, if necessary, positions of the lens frame and the original frame can be adjusted to alter forming conditions of an image for reconfirmation.

Focusing glass 4 is not necessarily required to be large enough for occupying the greater portion of the dimensions of opening 20. In practice, it is sufficient that the focusing glass 4 be capable of covering opening 20 to the degree of extending the vicinity of the optical axis center of light for photographing.

Conventionally, a pivotal radius of focusing glass 4 has been the same as the length A in the lateral direction of opening 20. In the focusing glass 4 of the process camera of the embodiment, however, the pivotal radius R1 can be reduced to a length A1 which is about a half of the length A in the lateral direction of opening 20. Accordingly, rotation of focusing glass 4 is facilitated and also the installation area for the process camera can be reduced.

The dimensions of vacuum board 5 are selected to be equal to the size A×B occupying the entire surface of opening 20. Vacuum board 5 is pivotably provided by the hinge 25 at a somewhat left-hand portion of the center of frame 2 as seen from front of the process camera. A pivotal axis Z of vacuum board 5 defined with hinge 25 is located in the center of a portion A2 not covered with focusing glass 4 of opening 20.

The pivotal axis Z is selected to be at a distance of R2 from one side of the shorter sides of vacuum board 5 and at a distance R3 from the opposite side thereto. Here, note that R2 is greater than R3. The distance R3 is nearly equal to A2/2 as described-above.

In a conventional device, an axis of rotation corresponded to a shorter side of vacuum board 5. The rotation radius thereof is (R2+R3), accordingly. By contrast, in the process camera according to the present embodiment, the maximum of the rotation axis of the vacuum board is R2, which is smaller than the conventional rotation radius is (R2+R3). This facilitates rotation of vacuum board 5 and the center of gravity of vacuum board 5 can be located nearer to the pivotal axis Z. The turning movement necessary for pivoting vacuum board 5 with handle 19 being held is proportional to a product of the weight of vacuum board 5 and the distance between the axis of rotation Z and the center of gravity of vacuum board 5 as described above. Accordingly, in the process camera of the present embodiment, the vacuum board 5 can be pivoted with a smaller effort that is required for such action in operating other known process cameras.

Furthermore, in a conventional device, almost all of the length (R2+R3) of the vacuum board 5 at an open position projected in the left direction from a left end of frame 2. In the process camera of the present invention, however, the length of only about (R2−R3) of vacuum board 5 projects to the left of frame 2 even when vacuum board 5 is located at an open position. The length of a space on the left side of frame 2 necessary for pivot movement of vacuum board 5 can be reduced to about 2R3(=A2). Accordingly, the installation space needed for such a process camera can be further reduced.

Referring to FIG. 3, a process camera of the preferred embodiment further includes a gas spring 16 for further facilitating pivot movement of vacuum board 5. On the back of vacuum board 5, a pin 15 is provided, to which tip one end of gas spring 16 is attached. The other end of gas spring 16 is inserted into a slit 29 provided on the upper surface of frame 2 to be rotatably attached to a predetermined fixed point in frame 2.

Figure 4:
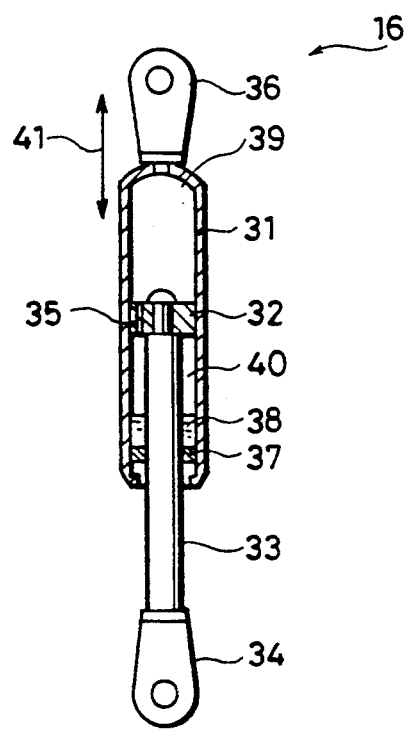
FIG. 4 is a partial cross sectional view of a Gas spring.

Referring to FIG. 4, gas spring 16 includes a cylinder 31, a piston 32 attached to a tip of a piston rod 33 inserted into cylinder 31, a mounting portion 36 provided on the side opposite to an open portion of cylinder 31, a mounting portion 34 provided on an end portion of piston rod 33 opposed to piston 32, a seal 37 for sealing the opening of cylinder 31, and oil 38 enclosed in a space inside cylinder 31. The space inside cylinder 31 is divided into A chamber 39 and B chamber 40 by piston 32. Chamber 39 communicate through a hole 35 formed in piston 32, which are filled with high-pressure gas. Mounting portion 36 is attached to pin 15 (FIG. 3) and mounting portion 34 is attache to the predetermined fixed point in frame 2, respectively.

The mounting portion 36 of gas spring 16 can move in the direction designated by the arrow 41. Gas spring 16 provides force similar to that of a spring with respect to displacement of mounting portion 36 with the as sealed in cylinder 31. Accordingly, referring to FIG. 3 again, the rotation of vacuum board 5 is facilitated due to the provision of gas spring 16. Accordingly, the operability of the process camera is further improved.

Gas spring 16 shown in FIGS. 3 and 4 further facilitates rotation of vacuum board 5. A similar function can also be implemented using other means. For example, in the process camera with its main portion shown in FIG. 5, there are provided instead of gas spring 16 in FIG. 3 an arm 26 of L-shape fixed to vacuum board 5 on the same axis as the pivotal axis Z and bended toward a shorter side less distant from the pivotal axis Z of vacuum board 5 at its tip, and a balance weight 27 attached to a tip of arm 26.

Balance weight 27 renders the center of gravity of vacuum board 5 closer to the pivotal axis Z side. Accordingly, the force necessary for rotating vacuum board 5 decreases as compared to one with no provision of arm 26 and balance weight 27.

Figure 5:
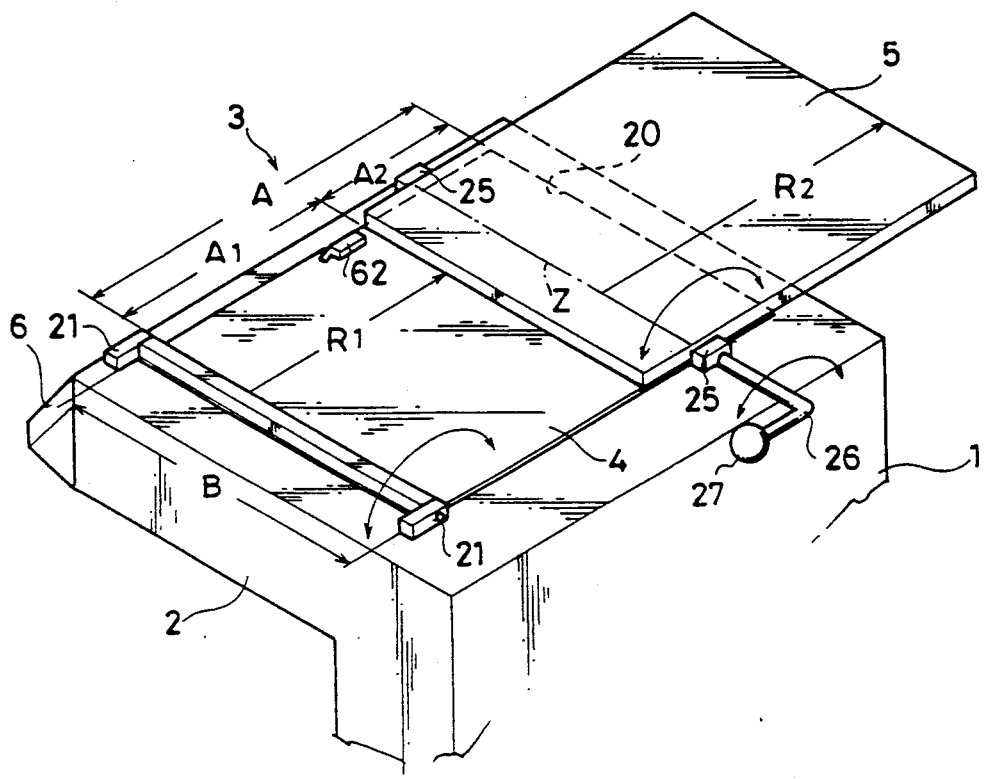
FIG. 5 is a perspective view of a main portion of a process camera of a second embodiment of the present invention.

In FIG. 5, the same reference characters and names are assigned to the same parts as those in FIG. 3. The dimensions and functions thereof are the same in both figures. Accordingly, a detailed description thereof is not repeated here.

Figure 6:
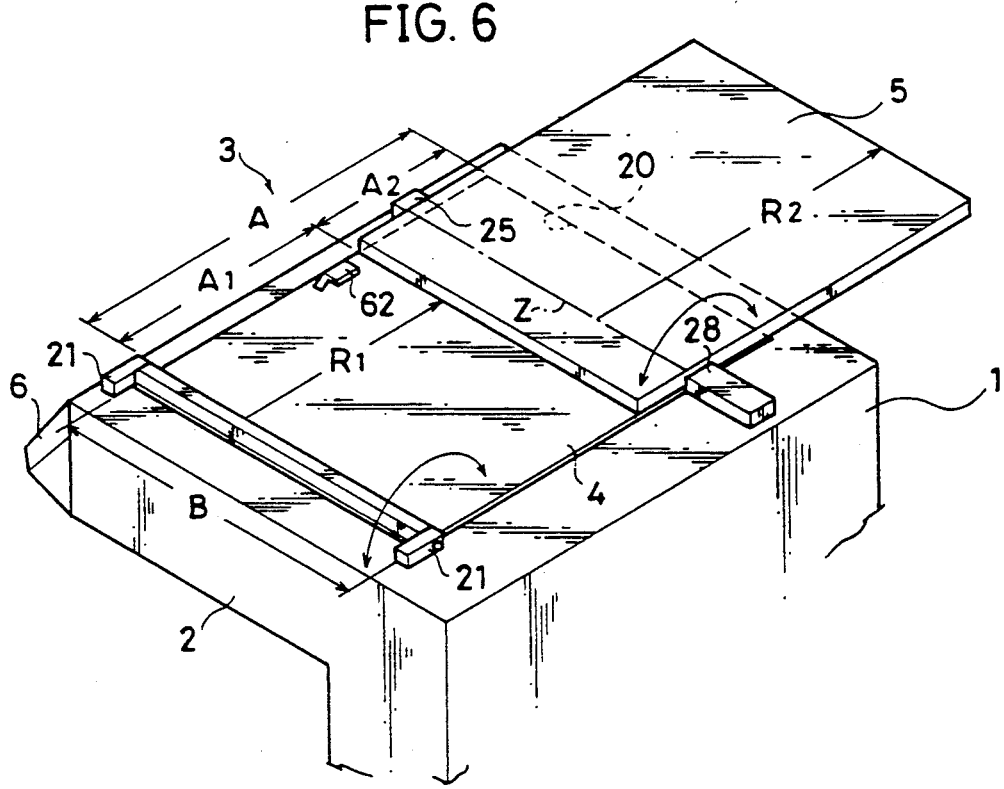
FIG. 6 is a perspective view of a process camera according to a third embodiment of the present invention.
Figure 7:
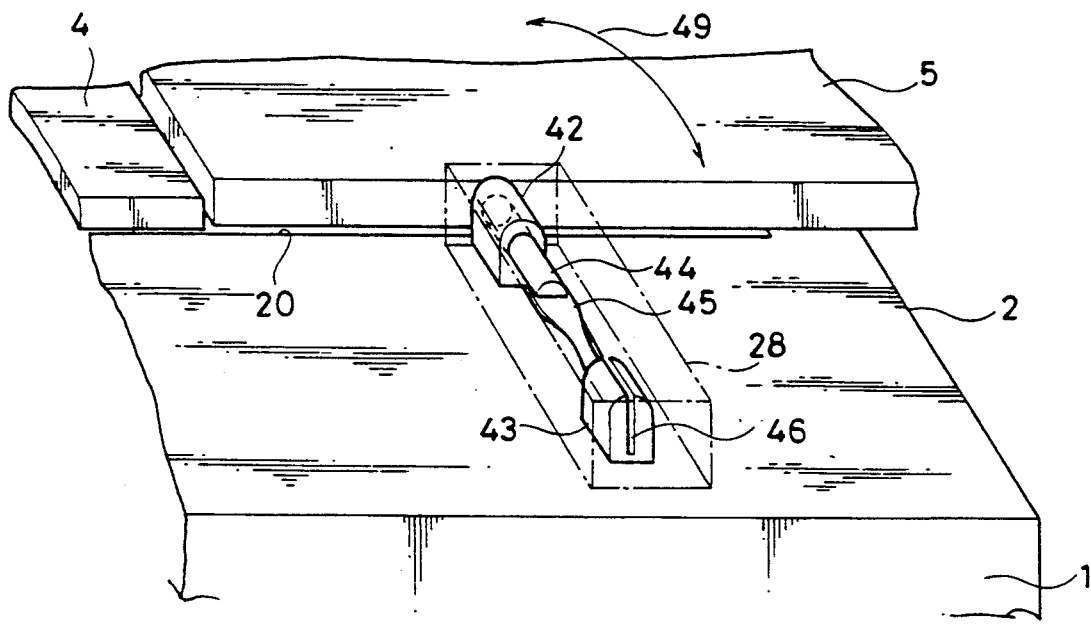
FIG. 7 is a partial enlarged perspective view of FIG. 6.

A function similar to that of gas spring 16 (FIG. 3) can also be implemented with still other means. FIGS. 6 and 7 show examples of such other means. Referring to FIG. 6, the process camera of a third embodiment is different from one shown in FIG. 3 in that it includes a hinge 28 including a plate spring in order to further facilitate rotation of vacuum board 5 instead of gas spring 16 of FIG. 3. In FIGS. 6 and 3, the same reference characters and names are assigned to the same parts. Functions thereof are also the same. Accordingly, a detailed description thereof is not repeated here.

Referring to FIG. 7, a hinge 28 is provided on the upper surface of frame 2 and includes a bearing 42 for rotatably supporting a shaft 44 provided on the side surface of vacuum board 5. A slit is formed on a tip of shaft 44. The slit of shaft 44 is formed to be parallel to the upper surface of frame 2 when vacuum board 5 is parallel to the upper surface of frame 2. Hinge 28 further includes a spring presser 43 provided on an extension of the axis of rotation of vacuum board 5 on the upper surface of frame 2 and having a gap 46 extending in the direction orthogonal to frame 2, and a plate spring 45 having its one end inserted into the slit of shaft 44 and the other end inserted into gap 46 of spring presser 43.

Plate spring 45 exerts no force to shaft 44 when vacuum board 5 stands vertically to frame 2 (when vacuum board 5 is at a neutral position). Plate spring 45, however, provides torque to shaft 44 to return vacuum board 5 to the neutral position when vacuum board 5 is at other positions. Accordingly, when vacuum board 5 pivots around the pivotal axis Z, vacuum board 5 is always biased to return of the neutral position. When vacuum board 5 is rotated from the open position to the closed position, and contrarily from the closed position to the open position, respectively, the force required both for starting and for stopping rotation of vacuum board 5 can be smaller than with the structure of the conventional process camera. Accordingly, the process camera of this invention has extremely excellent operability.

Figure 8:
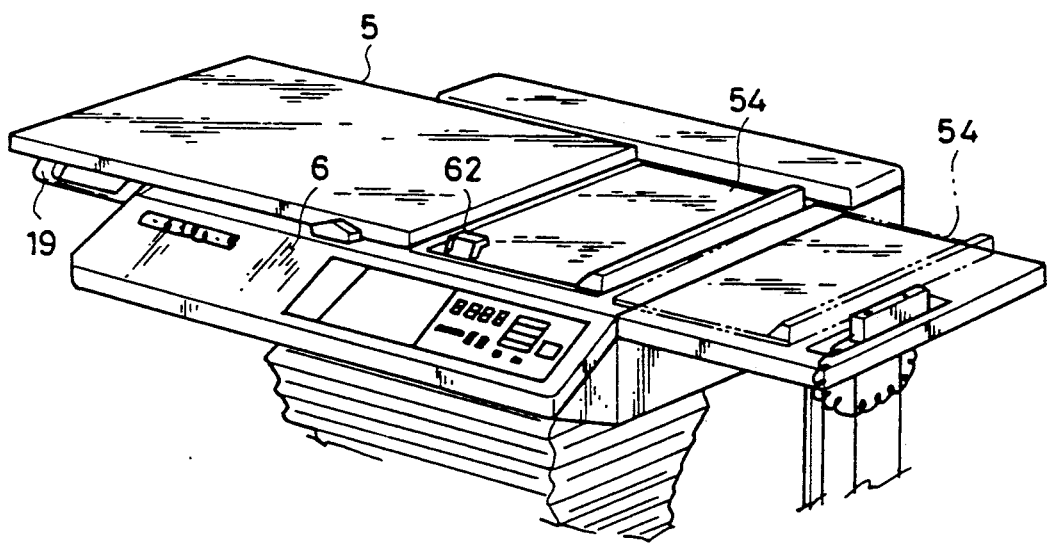
FIG. 8 is a perspective view of a main portion of a process camera according to a fourth embodiment of the present invention.

The present invention has been described according to the first, second and third embodiments above. The present invention, however, is not limited thereto. Referring to FIG. 8, for example, the process camera according to a fourth embodiment of the present invention of which main portion is shown in FIG. 8 includes a focusing glass 54 slidably attached to the upper surface of frame 2 instead of the focusing glass 4 shown in FIG. 3.

The dimensions of focusing glass 54 are selected to be the same as those shown in FIGS. 2 and 3. Such a process camera can also provide similar effects to those of process cameras described according to the first through third embodiments. In other points, the device shown in FIG. 8 and the devices shown in FIGS. 2 and 3 are the same. Accordingly, detailed description thereof is not repeated here.

The present invention has been described in detail referring to the figures above. The present invention, however, is not limited to the above-described preferred embodiments. A vertical process camera was taken as an example in the above-described preferred embodiments. Process cameras and focusing glass frames according to the present invention can be extremely easily applied to lateral low-bed or over-head type process cameras, for example. The gas spring 16 (FIG. 3), the arm 26 and the balance weight 27 (FIG. 5), the hinge 28 (FIG. 6) or the like are not necessarily needed. That is, according to the present invention, without using the balance weight or the hinge, a process camera is provided which can be easily operated as compared to a conventional process camera and so operated a smaller installation area.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process camera, comprising:
   original holding means, for holding an original;
   image projecting means, for projecting an image of said original held by said original holding means onto a predetermined image forming plate;
   light shielding means, having an opening of substantially rectangular shape, for defining said image forming plane and for forming a light shielding space between said image projecting means and said opening by covering a portion of a space between said image projecting means and said opening;
   an image forming member attached to said light shielding means and movable between a closed position to leave open a predetermined first portion of said opening, and covering only a second portion other than said first portion of said opening and an open position freeing said opening for forming an image of said original on the surface thereof by receiving light projected from said projecting means;
   film holding means, having a first plane for holding photosensitive film and a second plane; and
   mounting means, for mounting said film holding means to said light shielding means rotatably around a predetermined axis of rotation between a closed position covering almost all of said opening with said first plane and an open position covering only said first portion of said opening with a part of said second plane.

2. The process camera according to claim 1, wherein:
   said rectangular shape comprises a rectangle which is defined by a first pair of sides parallel to each other and a second pair of sides parallel to each other, and
   said first portion and said second portion of said opening are divided by a line parallel to said first pair of sides.

3. The process camera according to claim 2, wherein:
   said axis of rotation of said film holding means is provided parallel to said fit pair of sides, said axis of rotation of said film holding means being provided in centrally between said line parallel to said first pair of sides and one of said first pair of sides on the side of said first portion.

4. The process camera according to claim 3, wherein:
   said film holding means comprises a rectangular film holding plate defined by a pair of mutually parallel long sides and a pair of mutually parallel short sides; and
   said mounting means comprises film holding plate supporting means provided on said light shielding means along both of said second pair of sides of said opening, respectively, defining said axis of rotation, for supporting each of said pair of long sides of said film holding plate rotatably around said axis of rotation, each of said film holding plate supporting means being provided in the center between said segment parallel to said first pair of sides an done of said first pair of sides on the side of said first portion.

5. The process camera according to claim 4, wherein:
   said film holding plate supporting means comprises means for rotatably holding said film holding plate at each of said long sides at a predetermined first distance from one of said short sides.

6. The process camera according to claim 1, further comprising:
   first means for facilitating rotation of said film holding means around said axis of rotation.

7. The process camera according to claim 6, wherein:
said first means comprises weight means for brining a position of the center of gravity of said film holding means closer to said axis of rotation.

8. The process camera according to claim 6, wherein:
said first means comprises biasing means for biasing said film holding means toward a predetermined position between said closed position of said film holding means and said open position of said film holding means.

9. The process camera according to claim 1, further comprising:
means for mounting said image forming member rotatably around an axis parallel to said first pair of sides between said closed position of said image forming member and said open position of said image forming member on said light shielding member in the vicinity of one side closer to said second portion of said first pair of sides of said opening.

10. The process camera according to claim 1, further comprising:
means for holding said image forming member slidably between said closed position of said image forming member and said open position of said image forming member at one side closer to said second portion of said first pair of sides of said opening.

11. The process camera according to claim 1, wherein:
the area of said second portion of said opening covered with said image forming member is about half of the total area of said opening.

12. A focusing glass frame used in a process camera comprising original holding means for holding an original and image projecting means for projecting an image of said original held by said original holding means on a predetermined image forming plane, comprising:
a frame, having an opening substantially rectangular shape defining said image forming plane;
an image forming member, attached to said frame to be movable between a closed position covering to leave open a predetermined first portion of said opening, and covering only a second portion other than said first portion of said opening and an open position freeing said opening for forming an image of said original on the surface thereof by receiving light projected by said projecting means;
film holding means, having a first plane and a second plane, said first plane for holding photosensitive film; and
mounting means, for mounting said film holding means to said frame rotatably around a predetermined axis of rotation between a closed position covering almost all over said opening with said first plane and an open position covering only said first position of said opening with a portion of said second plane.

13. The focusing glass frame according to claim 12, wherein:
said rectangular shape comprises a rectangle which is defined by a first pair of sides parallel to each other and a second pair of sides parallel to each other, and
said first portion and said second portion of said opening are divided by a line parallel to said first pair of sides.

14. The focusing glass frame according to claim 13, wherein:
the axis of rotation of said film holding means is provided parallel to said first pair of sides in the center between said line parallel to said first pair of sides and one of said first pair of sides on the side of said first portion.

15. The focusing glass frame according to claim 14, wherein:
said film holding means comprises a rectangular film holding plate defined by a pair of mutually parallel long sides parallel; and
said mounting means comprises a pair of film holding plate supporting means provided on said light shielding means along both of said second pair of sides of said opening, defining said axis of rotation, and for supporting each of said pair of long sides of said film holding plate rotatably around said axis of rotation, each of said film holding plate supporting means being provided in the center between said segment parallel to said first pair of sides an done side of said first pair of sides on the side of said first portion.

16. The focusing glass frame according to claim 15, wherein:
said film holding plate supporting means comprises means for holding said film holding plate rotatably at each of said long sides at a predetermined first distance from one of said short sides.

17. The focusing glass frame according to claim 12, further comprising:
first means for facilitating rotation of film holding means around said axis of rotation.

18. The focusing glass frame according to claim 17, wherein:
said first means comprises weight means for brining the position of the center of gravity of said film holding means closer to said axis of rotation.

19. The focusing glass frame according to claim 17, wherein:
said first means comprises biasing means for biasing said film holding means toward a predetermined position in the middle of said closed position of said film holding means and said open position of said film holding means.

20. The focusing glass frame according to claim 12, further comprising:
means for mounting said image forming member rotatably around an axis parallel to said first pair of sides between said closed position of said image forming member and said open position of said image forming member on said light shielding means in the vicinity of one side closer to said second portion, said one side being one of said first pair of sides of said opening.

21. The focusing glass frame according to claim 12, further comprising:
means for holding said image forming member slidably between said closed position and said open position of said image forming member at one side closer to said second portion, said one side being one of said first pair of sides of said opening.

22. The focusing glass frame according to claim 12, wherein:
the area of said second potion of said opening is about half of the area of said opening.

* * * * *